Patented Oct. 22, 1946

2,409,629

UNITED STATES PATENT OFFICE 2,409,629

MANUFACTURE OF COATED BOARD

Clark C. Heritage, Cloquet, Minn., assignor to Wood Conversion Company, Cloquet, Minn., a corporation of Delaware No Drawing. Application September 9, 1939, Serial No. 294,213

6 Claims. (Cl. 92—40)

The present invention relates generally to coating compositions and to the use thereof. In particular it relates to the manufacture of artificial board with a coating thereon. It also relates particularly to such a coating applied during the manufacture of the board.

Heretofore, considerable difficulty has been encountered in attempts to produce coats on inherently rough surfaced fiber boards, of vegetable fiber, of natural mineral fiber, or of synthetic mineral fiber. To secure the desired color and permanence, it is necessary to cover entirely all of the exposed surface fibers. This may be done by loading the surfaces to fill all the interstices and to cover all the fibers. However, this is wasteful of coating material, and in addition it hides the texture of the uncoated board, which texture is often desired, not in the natural fiber color but in the same or other colors which may be of more varied and permanent character.

Heretofore, formed fiber boards, that is dry boards after formation, have been treated with coating compositions in attempts to give new surface colors. There are disadvantages in such practices. The composition either soaks in, or if it does not take well, the fibers are not wholly covered. A fractional area of exposed vegetable fiber readily affects the appearance and permanence of the color in spite of the fact that the added color itself may be permanent in character. This is due to a change in color in vegetable fiber when it is exposed to light. Also, on drying liquid coating compositions applied to dry board, the board may be pulled into a warp by stresses produced in the coat, if there is no restraint in drying. Particularly, boards which are made water-resistant when dry, do not take well any aqueous composition applied to surface, unless it is copiously applied. A copious application increases the warping tendency.

The present invention provides a composition which may be applied to boards while they are wet in process of manufacture, which takes well in both light and heavy usages to assure covering all the exposed fibers, and which may be used in small quantity to leave the texture and coat the fibers, or in higher quantity to coat the fibers and partially fill the interstices, thus exhibiting texture, or in still higher quantity which may hide the fibers and the interstices to form a smooth coat, practically hiding texture.

It is an object of the invention to provide a pigmented surface appearance on board with complete coverage of fiber surface by the pigment, and with varying effects in appearance of texture due to variations in usage.

It is also an object of the invention to provide a coating composition for wallboard, which may be used in process of manufacture or after manufacture of the finished board per se, which maintains its applied position and its covering power for fibers.

It is a particular object of the invention to provide an aqueous coating composition so that it may be used compatibly with wet stock in the manufacture of board.

It is also an object of the invention to use a coating composition which will withstand a high temperature such as to permit it to be dried simultaneously with a wet sheet carrying it in forming a board, and which is highly benefited by the action of heat on such drying.

It is another object of the invention to use a permanent white pigment to form a coated board of high light reflectance.

It is also an object of the invention to provide a coating composition and a coated board which is washable with soap and water; which is resistant to scuff; which may be easily painted later with oil-paints without high absorption of the oil; which resists absorption of water; which will not spot with water, and may be later painted with a water paint; which will not cause warping of the board; which is cleanable with wall paper cleaners; which lacks odor; and which has generally desirable characteristics to provide and to maintain pigmented colored walls or ceilings in a home, office, hall or like quarters.

Various other and ancillary objects and advantages of the invention will become apparent from the following description and explanation of the invention.

The boards for which the coating compositions are most desirable are the so-called insulating wall boards. For their practical uses, such boards are required to be water-proofed or water-resistant. This is commonly done in process of manufacture by using an emulsion of a water-proofing agent such as a fat, oil, wax or metallic soap, which will effect the result desired. Where wax is used as an emulsion, the emulsion is precipitated, as with alum, and the precipitated particles on the fiber do not attain their ultimate function until the board is dry. Thus, a so-treated board when dry is resistant to an aqueous coating composition. Yet the same board in process, while moist and before drying, is not resistant to such a composition. This is a very important distinction where low usage of coating material is desired. Under such conditions of low usage, the board surface (viewed microscopically) presents a brush-heap appearance, with individual fibers raised high from the body, and with deep recesses defined by other matted fibers of the brush-heap appearance. A thin coat of material must adhere to the entire surface of the fibers. Dry water-resistant fibers tend to repel the composition leaving uncoated portions of fibers, and forcing the composition to span the inter-fiber spaces. No perfect continuous color results, because of the uncoated portions of fibers showing through. Such a board is not stable in color because of the photochemical and atmospherically induced change of color in the exposed fiber. To avoid uncoated spots on fibers, high usage is required, which also has a filling action on the pores or interstices.

Accordingly, it is most important to provide a coating composition which is susceptible to use for entirely covering all the exposed fibers at very low usage.

The composition requires a pigment to give the color, and a vehicle therefor containing binder for binding pigment particles to each other and to the fiber. Mineral pigments are preferred, but any pigment which withstands the action of heat where it is encountered in the procedure chosen, as for example, where the wet coated board is oven dried.

The vehicle is essentially aqueous to assure a loss of vehicle substance in drying the coating, to assure mutual wetting of wet fibers and the composition, to avoid vapors of organic solvent material, and to lessen cost.

The binder for the present invention is one which may be dispersed in an aqueous vehicle, and which is set as a binder at normal temperature when dry, being either thermo-plastic or heat-hardening. In other words, resins which set on heating, as well as thermoplastic materials, are included. The binder may be water-soluble, water-emulsifiable, or otherwise dispersible in water. It may be a synthetic resin not in final reacted form, a condensation product capable of further reaction with itself or some other ingredient, or it may be a mixture of materials which react after application to the board. For example, it may be monomethylol urea, or dimethylol urea, or some water-soluble mixture or product of urea and formaldehyde. It may be an emulsion of phenol-aldehyde resin, or the alkyd resins which are thermo-setting with increasing temperature. Certain polymerized esters of alcohols and acrylic acid are water-soluble before the water is driven off, and insoluble thereafter, and hence, although thermoplastic, are suitable for use. The thermoplastic binders are not so universally useful as the heat-setting resins, since the former call for too careful action at the elevated temperatures where the binder is soft. Preferably, the heat-setting products are used which harden at high temperatures.

Emulsions of resins which are heat-setting are available on the market. One such is termed "Aquaplex" No. A-90, manufactured by Resinous Products & Chemical Company, Inc., of Philadelphia, Pennsylvania, and it is a glycerol-phthalate carried in aqueous suspension of 40% solids. It sets on losing water, as by drying, to an irreversible form. At elevated temperature setting property is enhanced.

*Example 1*

| | Parts by weight |
|---|---|
| "Aquaplex" No. A-90 | 28 |
| Water | 28 |
| Pigment (such as titanium dioxide) | 44 |

*Example 2*

| | Parts by weight |
|---|---|
| "Aquaplex" No. A-90 | 24 |
| Water | 39 |
| Pigment (such as titanium dioxide) | 36 |

*Example 3*

| | Parts by weight |
|---|---|
| "Aquaplex" No. A-90 | 34 |
| Water | 34 |
| Calcium carbonate | 32 |

The above composition of Example 1 is preferred. It contains about 45% water, and the proportions of solids to water are made such as to render the composition suitable for the process of application, which is specifically the use of a roll pressing on wet board (60% water) behind which roll there is a pool of the composition.

In the preferred composition of Example 1 there are about 11 parts of binder to 44 parts of pigment, which makes a coating residue of about 20% binder. These proportions are by no means limitations, because the amount of water depends in part upon the workability of the process, and the proportion of binder to pigment depends in part upon the kind and form of pigment. The pigment however, should predominate, inasmuch as the intended coat is one of particles cemented to each other and to fiber, rather than a film of vehicle in which the pigment is dispersed.

With reference to the above preferred example, it is to be noted that the "Aquaplex" emulsion is diluted about 100% with water, and the pigment is ultimately dispersed in the diluted emulsion. The binder and the pigment are each largely suspended independently of each other in the aqueous vehicle.

The composition has high adherence and uniform spreading power over wet fibers, with or without a latent water-proofing compound, such as paraffin precipitated from emulsion in the fiber slurry which forms the board. In high usage it also has adherent power to dried fibers with or without the water-proofing treatment. But in low usage it does not adhere uniformly to the dried water-proofed board.

By applying the preferred composition to moist or wet board before the first drying, light to heavy usage may be employed with variable results as desired. By drying the coating and the board together, the tensions resulting are such that the coating, even though it is thick, does not pull the board into a warp.

The coating may be applied by brushing, by spraying, by roll transfer, by roll and pool, or by doctor blade, according to desire. The viscosity of the coating is pertinent to the method of application, and it may be controlled by varying the water content, or the binder content, or both, or the kind or form of the pigment. For example, a composition which is suitable for application by a pool behind a roll, is suitable for application by spraying, but every composition which is suitable for spray-coating is not suitable for the roll and pool method.

The effect of viscosity is exemplified by reference to the use of a pool behind a roll. In such use the moist mat approaches downwardly the nip of two rolls and passes through with the formation of a pool of coating composition on the mat behind the top roll. The moisture in the mat and fibers assures that the fibers are wettable by the composition, and the covering pool assures perfect contact.

The pressure of the upper roll is controllable in the degree with which it compresses the mat. Thus it effects a forcing of the composition well into the surface, controls the amount which is squeezed back into the pool, and hence controls the amount left on the mat. The fibers at the top spring back and carry with them a perfect coat of pigment. In such springing back, the pores tend to suck in any free liquid. Where a light usage is employed, the fibers rather than the void spaces select the composition. Where heavy coats are used, the interstices are comparably filled.

In drying, the mass and the fibers shrink in sufficiently close degree to maintain a complete coat on the fibers, and to fill the interstices as the quantity permits. In practice the coated mat is dried at 310° F. to 345° F. Thus, moisture is practically boiled out of the board. In light usages, the interstices being not sealed, permit the water vapor to escape. Where the composition is present to such an extent as to seal the pores, microscopic craters may be found where the steam blows out. However, these craters do not alter the continuous colored or white appearance of the surface.

The drying of the preferred composition at the elevated temperatures sets the binder to insoluble infusible resin form. Where the given composition is spread upon the board at a usage of 57 lbs. of composition (or 25 lbs. of pigment) per 1000 sq. feet, a board is obtained as follows:

1. Initial light-reflectivity is 78%.
2. Color-high white.
3. Permanent against discoloration.
4. A substantial retention of porosity and sound absorbency (due to craters).
5. Matted surface is retained, giving dull effect lacking glare.
6. Texture is unaltered by coating.
7. Surface is resistant to cleaning, washing, and scuffing.
8. Surface readily redecorated with oil or water base paints, lacquers, etc., without undue absorption.
9. Coating is continuous except for microscopic craters.

There are commercially available water-dispersible compositions of other resins suitable for use in the present invention. Heat-hardening phenol-aldehyde resins are so available. Heat-hardening urea-formaldehyde resins are also available.

It is a practice in making boards to add filler or sizing material to the stock so as to leave the same in the finished board, for example, a colloidal starch. This may be done with the stock of which the mat is to be coated, without in any way interfering with the invention as described. Also, where such filler is or is not present, the surface of the wet mat may be sized with the same effect by wetting the formed board with a thickened sizing solution, such as gelatine or other protein, or starch or the like. This penetrates into the surface for a limited distance, so that on drying the board, the so-treated surface is harder and more resistant to scuff. Such size more readily enters the board than the coating composition with its load of pigment. By using such size preliminarily to using the composition, more of the binder of the composition remains in the pigment coat. Thus, where a more expensive binder, such as synthetic resin is employed, its quantity may be reduced. A starch solution (thick-boiled as in laundering) may be used as an undercoat, filling the pores and sizing the fibers, and while the board is still wet with such starch solution, the pigmented aqueous composition may be applied, as if no sizing were present.

In the specification and accompanying claims where reference is made to binding the particles of pigment to the fiber, it is to be understood that the fiber may be sized before or after the mat is formed, as described, or not at all.

From the foregoing it will be understood how the invention may be varied within the scope of the appended claims.

I claim:

1. The method of making a coated rigid porous structural fiber board which comprises coating a wet structural-board-forming mat of fibers with a composition having sufficient pigment to hide the surface fibers, and having an aqueous vehicle in which is dispersed a heat-reactive binding material capable of binding the pigment to the fiber and to itself, said binding material after reaction by heat being set when dry at normal temperature and exerting an adhesive action at an elevated temperature at least prior to completed thermal reaction, and drying the mat and the coat thereon simultaneously at an elevated temperature to form the board.

2. The method of making a coated rigid porous structural fiber board which comprises coating a wet structural-board-forming mat of fibers with a composition having sufficient pigment to hide the surface fibers, and having an aqueous vehicle in which is dispersed heat-hardening binding material capable of binding the pigment to the fiber and to itself, and drying the mat and the coat thereon simultaneously at an elevated temperature to form the board.

3. The method of making a coated water-resistant rigid porous structural vegetable fiber board which comprises forming a water slurry of wet vegetable fibers carrying a water-proofing agent deposited thereon, forming said slurry into a wet structural-board-making mat, coating said wet mat with a composition having pigment to cover the exposed fibers of said mat and having an aqueous vehicle in which is dispersed heat-reactive binding material capable of binding the pigment to the fiber and to itself, said binding material after reaction by heat being set when dry at normal temperature and exerting an adhesive action at an elevated temperature at least prior to completed thermal reaction, and drying the mat and the coat thereon simultaneously at an elevated temperature to form the board.

4. The method of making a coated water-resistant rigid porous structural vegetable fiber board which comprises forming a water slurry of wet vegetable fibers carrying a water-proofing agent deposited thereon, forming said slurry into a wet structural-board-making mat, coating said wet mat with a composition having pigment to cover the exposed fibers of said mat and having an aqueous vehicle in which is dispersed heat-hardening binding material capable of binding the pigment to the fiber and to itself, and drying the mat and the coat thereon simultaneously at an elevated temperature to form the board.

5. The method of making a coated water-resistant rigid porous structural vegetable fiber board which comprises forming a water slurry of wet vegetable fibers carrying a water-proofing agent deposited thereon, forming said slurry into a wet structural-board-making mat, coating said wet mat with a composition having pigment to cover the exposed fibers of said mat and having an aqueous vehicle in which is dispersed heat-hardening alkyd resin capable of binding the pigment to the fiber and to itself, and drying the mat and the coat thereon at an elevated temperature to form the board.

6. The method of making a coated water-resistant rigid porous structural vegetable fiber board which comprises forming a water slurry of wet vegetable fibers carrying a water-proofing agent deposited thereon, forming said slurry into a wet structural-board-making mat, coating said wet mat with a composition having pigment to cover the exposed fibers of said mat and having an aqueous vehicle in which is dispersed heat-hardening alkyd resin capable of binding the pigment to itself and to the fibers, the quantity of composition applied being sufficient when dry to seal the pores of the board, and drying the mat and the coat thereon simultaneously under conditions to boil off water in the mat, whereby microscopic steam craters are formed and set in an otherwise continuous coat on said board.

CLARK C. HERITAGE.